United States Patent
Yang et al.

(10) Patent No.: US 8,668,043 B2
(45) Date of Patent: Mar. 11, 2014

(54) SELF-PROPELLED ELECTRIC MOWER

(75) Inventors: Jian Yang, Jiangsu (CN); Xiaofei Li, Jiangsu (CN)

(73) Assignee: Changzhou Groundtools Co. Ltd., Jiangsu (CN)

( * ) Notice: Subject to any disclaimer, the term of this patent is extended or adjusted under 35 U.S.C. 154(b) by 33 days.

(21) Appl. No.: 13/381,642

(22) PCT Filed: Dec. 24, 2009

(86) PCT No.: PCT/CN2009/075999
§ 371 (c)(1),
(2), (4) Date: Dec. 29, 2011

(87) PCT Pub. No.: WO2011/006338
PCT Pub. Date: Jan. 20, 2011

(65) Prior Publication Data
US 2012/0097469 A1      Apr. 26, 2012

(30) Foreign Application Priority Data
Jul. 13, 2009   (CN) .......................... 2009 1 0182389

(51) Int. Cl.
*B60K 17/00* (2006.01)

(52) U.S. Cl.
CPC ...................................... *B60K 17/00* (2013.01)
USPC ............................. 180/350; 180/357; 180/366

(58) Field of Classification Search
USPC ............... 180/350, 19.1, 19.3, 342, 366, 357; 56/11.8, 11.2, 11.4, 16.9
See application file for complete search history.

(56) References Cited

U.S. PATENT DOCUMENTS

| | | | | |
|---|---|---|---|---|
| 3,445,991 | A * | 5/1969 | Deptula et al. | 56/11.8 |
| 4,020,619 | A * | 5/1977 | Massaro | 180/19.3 |
| 4,214,641 | A | 7/1980 | Hauser | 180/19.1 |
| 5,718,105 | A * | 2/1998 | Irikura et al. | 180/19.1 |
| 5,778,645 | A * | 7/1998 | Irikura et al. | 56/11.8 |
| 5,887,484 | A * | 3/1999 | Abend et al. | 180/19.1 |
| 6,475,109 | B2 | 11/2002 | Blanchard | 474/101 |
| 6,701,796 | B2 * | 3/2004 | Blanchard | 56/11.3 |
| 6,705,961 | B2 * | 3/2004 | Johnson et al. | 56/11.4 |
| 7,175,012 | B2 * | 2/2007 | Ruebusch et al. | 192/69.63 |
| 2006/0060017 | A1 | 3/2006 | Helin et al. | 74/640 |

FOREIGN PATENT DOCUMENTS

| | | |
|---|---|---|
| CN | 101077050 | 11/2007 |
| CN | 201426268 | 3/2010 |
| FR | 2889276 | 2/2007 |

* cited by examiner

*Primary Examiner* — Hau Phan
(74) *Attorney, Agent, or Firm* — Ladas & Parry, LLP

(57) ABSTRACT

The invention relates to a self-propelled electric mower. The self-propelled electric mower comprises a cutter arranged on the machine body (1), an electric motor for driving the cutter to operate, and road wheels (2) arranged on the machine body. A driving device (3) for driving the machine body to walk is arranged on the machine body and comprises a transmission system (4) for driving the road wheels to move and a power source (5) for driving the transmission system to work. The transmission system comprises belt transmissions (4-1) connected with the power source, external gear transmissions (4-2) connected with the belt transmissions, and internal gear transmissions (4-3) connected with the external gear transmissions and in meshing connection with the road wheels. The self-propelled electric mower provided by the invention obtains higher transmission ratio by using multi-stage transmission, so that the output torque of the driving motor is reduced, the volume and the cost of the driving motor are decreased, the self-propelled walking function is realized, noise is lowered, and energy is saved.

2 Claims, 1 Drawing Sheet

SELF-PROPELLED ELECTRIC MOWER

CROSS-REFERENCE TO RELATED APPLICATIONS

This application is the U.S. National Stage of International Patent Application No. PCT/CN2009/075999 filed on Dec. 24, 2009, which claims priority to Chinese Patent Application Number 200910182389.5 filed on Jul. 13, 2009, the disclosures of which are hereby incorporated by reference in their entireties.

TECHNICAL FIELD OF THE INVENTION

The invention relates to the field of electric mowers, in particular to an electric mower capable of realizing self-propelled function.

BACKGROUND OF THE INVENTION

At present, mowers are used very widely, especially in the gardening and the greening of parks, etc. However, since the walking function of the traditional mower is realized by the driving of a mowing electric motor, the mower walks only when the mowing motor is started, and stops walking when the mowing motor stops, so the mower cannot walk in self-propelled manner. When not mowing, the mower is moved manually. If the walking function is activated when the mower is not in operation, great noise and vibration can be generated, and more energy is consumed, so that resource is wasted greatly.

SUMMARY OF THE INVENTION

The technical problem to be solved by the present invention is that: in order to solve the existing defects and deficiencies mentioned above, the invention provides a self-propelled electric mower.

In order to solve the technical problem, the technical solution the invention adopted is: the self-propelled electric mower comprises a machine body, a cutter arranged on the machine body, an electric motor for driving the cutter to operate, and road wheels connected to the machine body; a driving device for driving the machine body to walk is arranged on the machine body and comprises a transmission system for driving the road wheels to move and a power source for driving the transmission system to work. Since the transmission system is driven to work by the power source, the road wheels are driven to rotate by the transmission of the transmission system, and the purpose of walking can be achieved.

Further, in order to reduce noise, the power source is a low-power driving motor.

In order to reduce the output torque of the driving motor, the transmission system comprises belt transmission connected with the power source, external gear transmission connected with the belt transmissions, and internal gear transmission connected with the external gear transmissions and in meshing connection with the road wheels.

In order to improve the transmission ratio and decrease the volume and the cost of the driving motor, there are two sets of belt transmissions.

In order to improve the transmission ratio, there are two sets of external gear transmissions.

In order to improve the transmission ratio, there are two sets of internal gear transmissions.

In the invention, the transmission system can all adopt belt transmission or all adopt gear transmission, both achieving the same effect. Besides, the driving motor can be various DC or AC motors, which can achieve the same effect in use.

The invention has the benefits as follows: the self-propelled electric mower provided by the invention obtains higher transmission ratio by using multi-stage transmission, so that the output torque of the driving motor is reduced, the volume and the cost of the driving motor are decreased, the self-propelled walking function is realized, noise is lowered, and energy is saved.

BRIEF DESCRIPTION OF THE DRAWINGS

Next, the invention is further explained in combination with the drawings and the embodiment.

Figure 1:
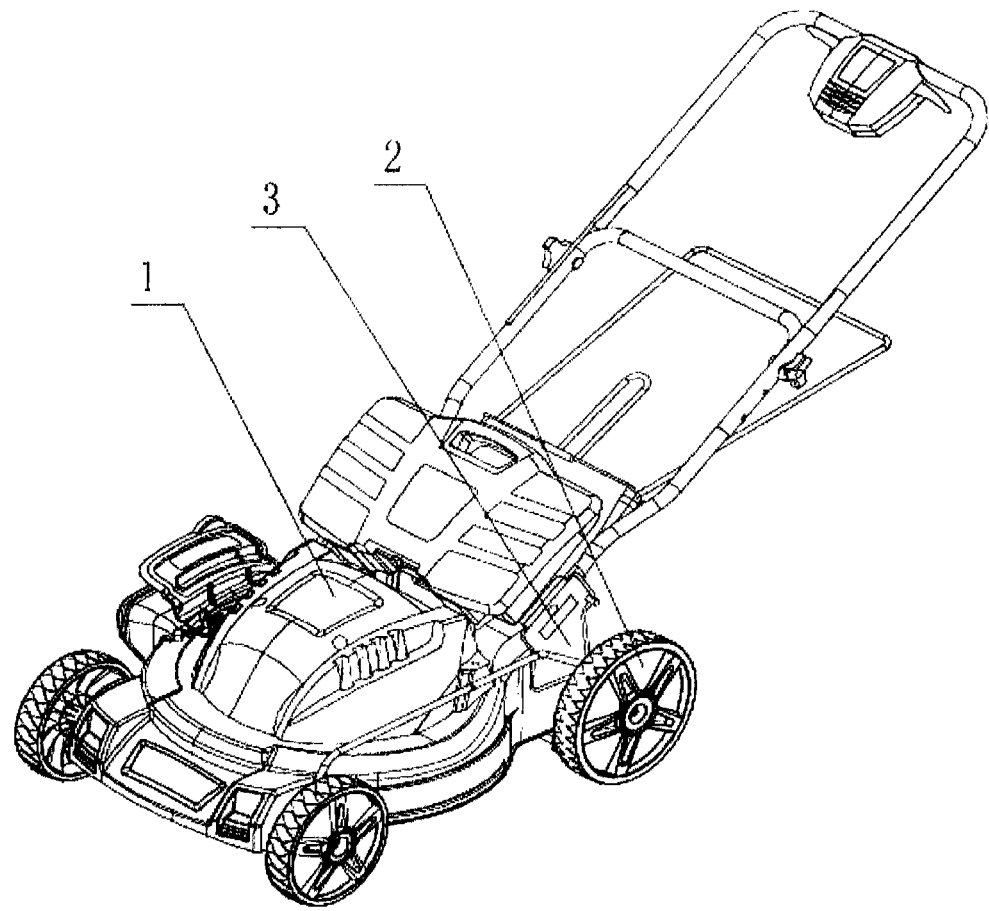
FIG. 1 is the diagram of the integral structure of the invention.

In the drawings, 1_machine body, 2_road wheels, 3_driving device, 4_transmission system, 4-1_belt transmission, 4-2_external gear transmission, 4-3_internal gear transmission, 5_power source.

DETAILED DESCRIPTION OF THE INVENTION

Now, the invention is further detailed in combination with the figures. The figures are all simplified schematic diagrams and only illustrate basic structure of the invention schematically, so that only the components relating to the invention are shown in the figures.

The self-propelled electric mower of the optimal implementation is shown in the drawings. As shown in FIG. 1, the self-propelled electric mower comprises a machine body 1, a cutter arranged on the machine body 1, an electric motor for driving the cutter to operate, and road wheels 2 connected to the machine body 1. A driving device 3 for driving the machine body 1 to walk is arranged on the machine body 1.

Figure 2:
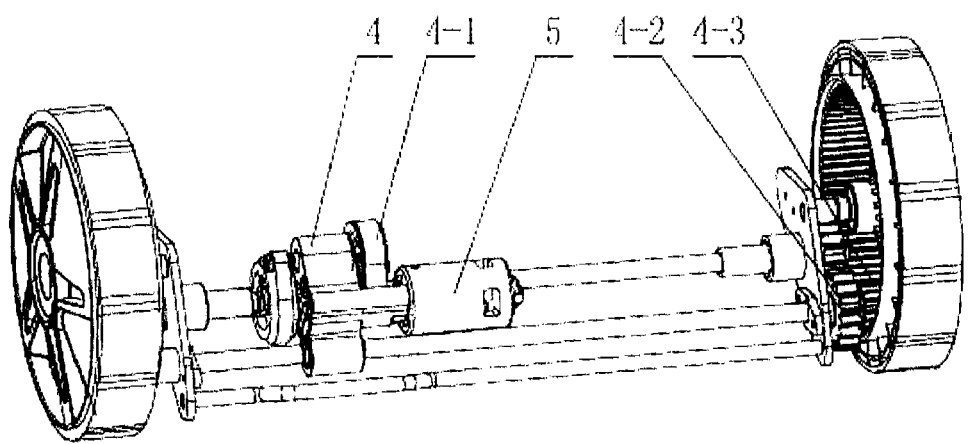
FIG. 2 is the diagram of the local structure of FIG. 1.

The diagram of the partial structure shown in FIG. 2 relates to the structural diagram of the driving device. The driving device 3 comprises a transmission system 4 for driving the road wheels 2 to move and a driving motor for driving the transmission system 4 to work, and the transmission system 4 comprises two sets of belt transmissions 4-1 connected with the driving motor, external gear transmissions 4-2 connected with the belt transmissions 4-1, and internal gear transmissions 4-3 connected with the external gear transmissions 4-2 and in meshing connection with the road wheels 2.

When implementing the invention, the driving motor is actuated first, which drives belt wheels to operate. The belt wheels, after being driven to operate, drive the gears to operate through a belt. Afterwards, the road wheels 2 are driven to rotate through meshing of the gears, so that the purpose of the self-propelled walking of the whole device is achieved. When the electric mower arrives at the position where mowing is required, the driving motor is stopped, and the electric motor is started for mowing and driving the whole device to move simultaneously.

Inspired by the ideal embodiment of the invention and based on the content of the above description, one skilled in the art can certainly make various alterations and modifications without diverging from the technical concepts of the invention. The protection scope of the invention must be defined according to the scope of the claims instead of being limited by the content of the specification.

The invention claimed is:

1. A self-propelled electric mower device, comprising a machine body; a cutter arranged on the machine body; an electric motor arranged on the machine body for driving the cutter; road wheels arranged on the machine body; a driving device for driving the machine body and arranged on the machine body; the driving device comprising a transmission system for driving the road wheels and a separate power source for driving the transmission system, wherein the transmission system comprises two belt transmission sets connected with the power source, two external gear transmission sets connected with the belt transmission sets, and two internal gear transmission sets connected with the external gear transmission sets and in meshing connection with the road wheels, and the power source is a power-driven motor.

2. The self-propelled electric mower device of claim 1, wherein the electric motor arranged on the machine body is configured to drive the cutter and the whole device simultaneously and the driving device is configured to drive the machine body only.

* * * * *